US008662339B2

(12) United States Patent
Sprunger

(10) Patent No.: US 8,662,339 B2
(45) Date of Patent: Mar. 4, 2014

(54) FLAVOR ENHANCEMENT APPARATUS AND METHOD

(76) Inventor: Timothy R. Sprunger, Kissimmee, FL (US)

( * ) Notice: Subject to any disclaimer, the term of this patent is extended or adjusted under 35 U.S.C. 154(b) by 28 days.

(21) Appl. No.: 12/982,347

(22) Filed: Dec. 30, 2010

(65) Prior Publication Data

US 2011/0155732 A1     Jun. 30, 2011

Related U.S. Application Data

(60) Provisional application No. 61/284,972, filed on Dec. 30, 2009, provisional application No. 61/458,201, filed on Nov. 19, 2010.

(51) Int. Cl.
*B65D 51/18* (2006.01)
*B65D 51/28* (2006.01)

(52) U.S. Cl.
CPC ............ *B65D 51/2807* (2013.01); *B65D 51/18* (2013.01)
USPC ............................ 220/521; 220/212; 220/713

(58) Field of Classification Search
CPC ..... B65D 51/2807; B65D 51/28; B65D 51/24
USPC ......... 220/212, 521, 713, 711, 703, 372, 371, 220/367.1, 694, 500, 200; 215/228, 200, 215/227; 426/665, 80; 206/216
IPC ............ B65D 51/18, 51/00; B65B 29/02, 29/00
See application file for complete search history.

(56) References Cited

U.S. PATENT DOCUMENTS

| 3,083,101 | A | * | 3/1963 | Noury | 99/295 |
| 3,743,520 | A | * | 7/1973 | Croner | 426/87 |
| 3,811,373 | A | * | 5/1974 | Telco | 99/295 |
| 4,800,089 | A | * | 1/1989 | Scott | 426/78 |
| 5,082,676 | A | * | 1/1992 | Love et al. | 426/79 |
| 5,515,994 | A | * | 5/1996 | Goglio | 220/372 |
| 5,775,205 | A | * | 7/1998 | Melton | 99/322 |
| 5,906,845 | A | * | 5/1999 | Robertson | 426/80 |
| 6,076,450 | A | * | 6/2000 | DiGiorgio, Jr. | 99/298 |
| 6,112,452 | A | * | 9/2000 | Campbell | 43/107 |
| 6,468,332 | B2 | * | 10/2002 | Goglio et al. | 96/134 |
| 6,578,726 | B1 |  | 6/2003 | Schaefer |  |

(Continued)

FOREIGN PATENT DOCUMENTS

JP     2006-198356     8/2006

OTHER PUBLICATIONS

PCT Notification of International Search Report and Written Opinion mailed Aug. 26, 2011, entire report.

*Primary Examiner* — Robert J Hicks
(74) *Attorney, Agent, or Firm* — Allen, Dyer, Doppelt, Milbrath & Gilchrist, P.A.

(57) ABSTRACT

A liquid flavor enhancement apparatus includes a lid for a container adapted to hold a liquid to be consumed and an aroma pod arranged in the lid. The lid defines a consumption opening extending therethrough to allow passage of the liquid from the container through the lid during consumption of the liquid. The aroma pod includes a body adapted for insertion into a liquid container lid, and has an aromatic material retained therein. Air inside the container is allowed to pass through the aroma pod from the second to the first surface of the lid. The container is filled such that the liquid does not contact the aromatic material during filling.

18 Claims, 5 Drawing Sheets

(56) References Cited

U.S. PATENT DOCUMENTS

| | | |
|---|---|---|
| 7,175,043 B2 | 2/2007 | O'Neal |
| 2004/0060934 A1* | 4/2004 | Haynes et al. ................ 220/212 |
| 2006/0071008 A1 | 4/2006 | Sadlier |
| 2007/0075081 A1* | 4/2007 | Stokes ......................... 220/212 |
| 2009/0250479 A1* | 10/2009 | Kaufman et al. ............. 220/713 |

* cited by examiner

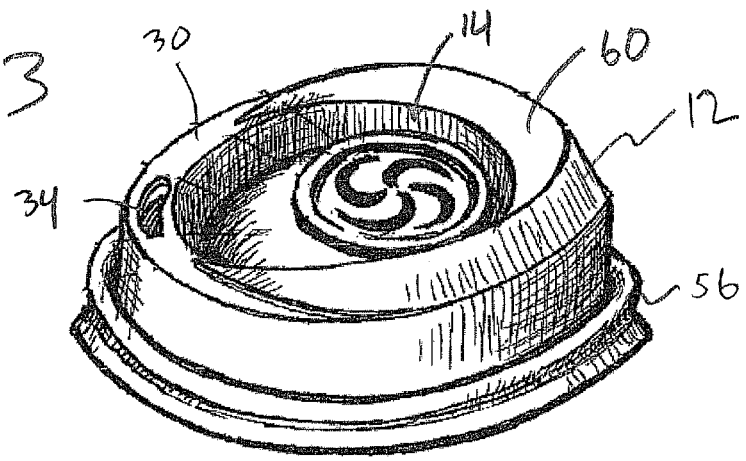
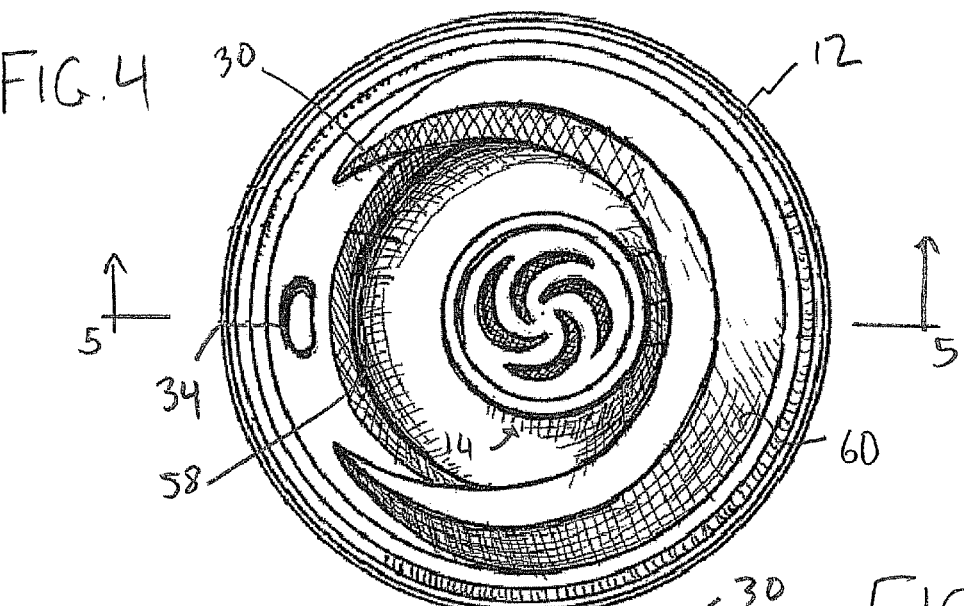
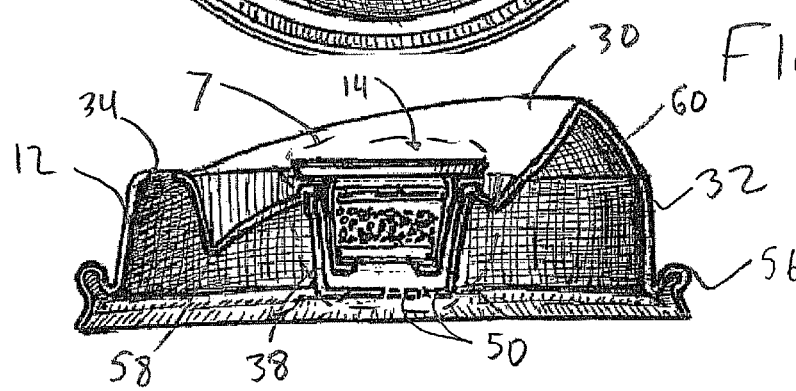

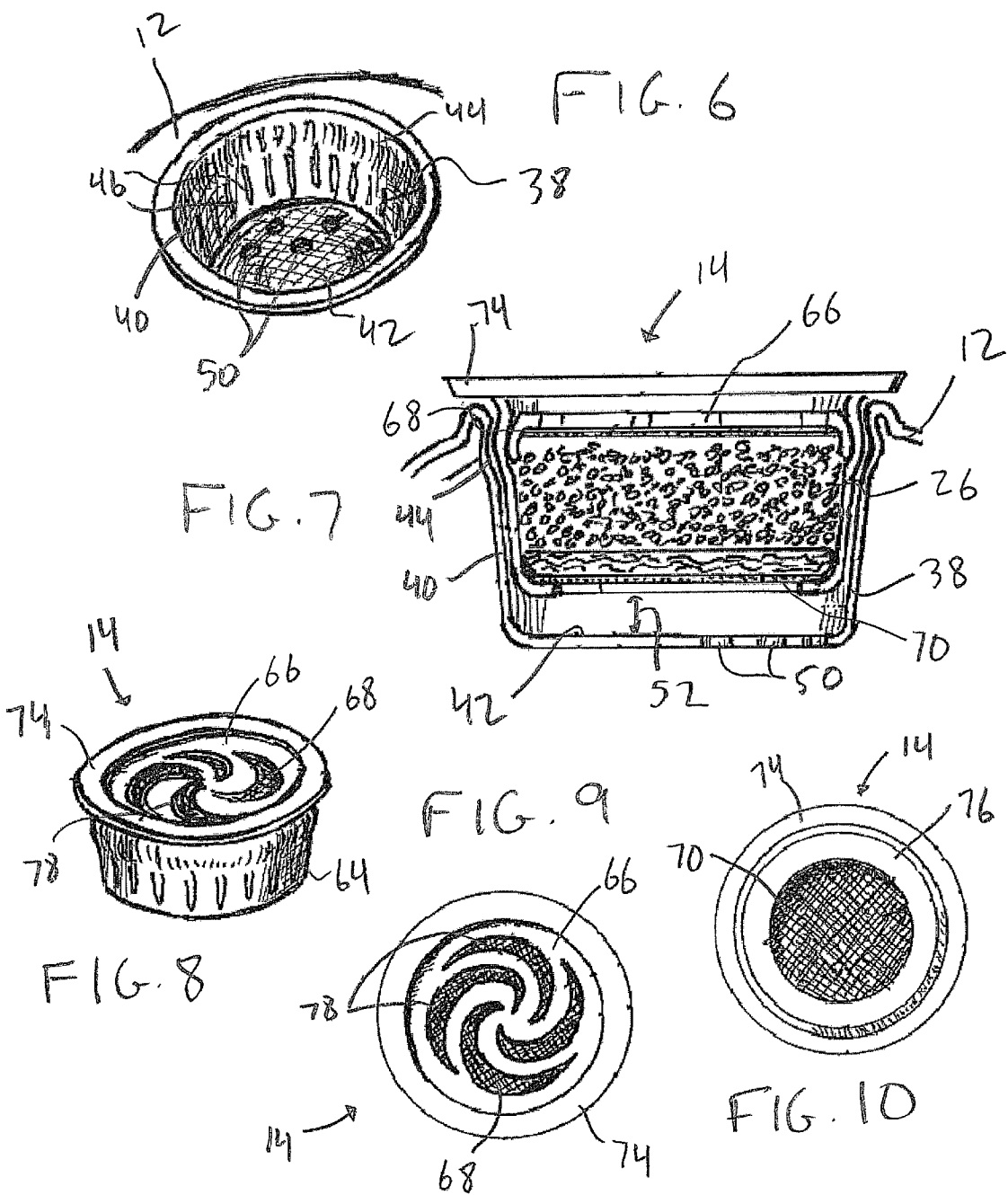

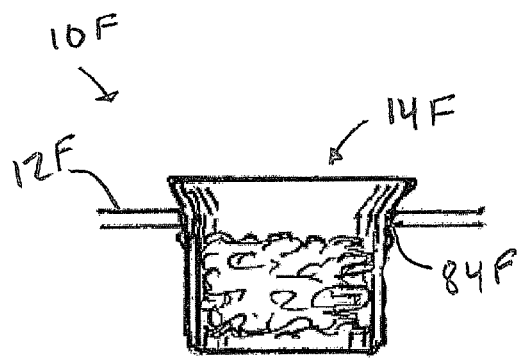
FIG. 17
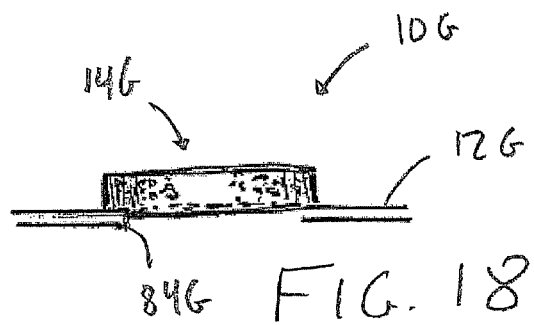
FIG. 18
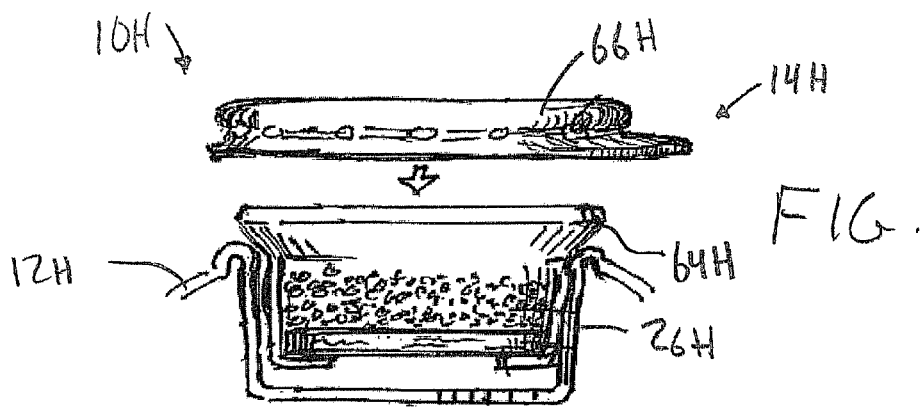
FIG. 19
FIG. 20
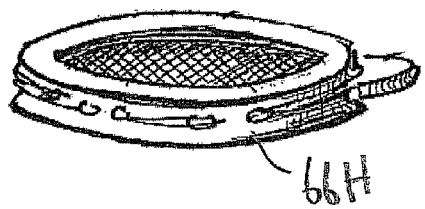

FLAVOR ENHANCEMENT APPARATUS AND METHOD

CROSS-REFERENCE TO RELATED APPLICATIONS

This application claims the benefit of U.S. Provisional Application Ser. No. 61/458,201, filed on Nov. 19, 2010, and U.S. Provisional Application Ser. No. 61/284,972, filed on Dec. 30, 2009, the contents of which applications are herein incorporated by reference in their entirety.

FIELD OF THE INVENTION

The present invention relates to flavor enhancement, and more particularly, to apparatus for enhancing the flavor of beverages and other consumable liquids.

BACKGROUND OF THE INVENTION

It is well known that a significant portion of the taste of food and drink is attributable to its smell. Accordingly, attempts have been made to enhance the taste of a food or drink by the use of a separate aromatic element. For example, some attempts involve the impregnation of a plastic drink container and/or lid with aroma. Naturally, this approach requires that the source of the aroma be distilled or otherwise processed into a form suitable for impregnation, if possible. Another approach involves heating an aroma source in connection with drinking, which necessitates an electrical power source, wiring and the like for operation. Despite these attempts, improvements are still possible.

SUMMARY OF THE INVENTION

In view of the foregoing, it is an object of the present invention to provide an improved flavor enhancement apparatus and method, and more particularly, a flavor enhancement apparatus and method for liquids. According to an embodiment of the present invention, a liquid flavor enhancement apparatus includes a lid for a container adapted to hold a liquid to be consumed and an aroma pod arranged in the lid.

The lid has a first surface facing generally away from the container and a second surface facing generally toward the container. The lid defines a consumption opening extending therethrough to allow passage of the liquid from the container through the lid during consumption of the liquid.

The aroma pod includes a body adapted for insertion into a liquid container lid, first and second aroma-permeable retention elements arranged within the body and an aromatic material retained in the body between the first and second retention elements. Air inside the container is allowed to pass through the aroma pod from the second to the first surface of the lid.

According to a method aspect of the present invention, a method of liquid flavor enhancement includes filling a container with a liquid, arranging a lid having an aroma pod with an aromatic material therein, over the container, such that air from within the container exits through the aroma pod. The container is filled such that the liquid does not contact the aromatic material during filling.

These and other objects, aspects and advantages of the present invention will be better appreciated in view of the drawings and following detailed description of the preferred embodiment.

BRIEF DESCRIPTION OF THE DRAWINGS

FIG. 3 is a perspective view of the lid and aroma pod of FIG. 1;

FIG. 4 is a top view of the lid and aroma pod of FIG. 1;

FIG. 5 is a sectional view of the lid and aroma pod of FIG. 1, taken along line 5-5 of FIG. 4;

FIG. 6 is a partial perspective view of the lid of FIG. 1 with the aroma pod removed;

FIG. 7 is detail sectional view of area 7 of FIG. 5;

FIG. 8 is a perspective view of the aroma pod of FIG. 1;

FIG. 9 is a top view of the aroma pod of FIG. 1;

FIG. 10 is a bottom view of the aroma pod of FIG. 1;

FIGS. 17 and 18 are partial sectional side views of lids and aroma pods, according to further embodiments of the present invention;

FIG. 19 is a partial sectional side view of a lid and aroma pod, according to an additional embodiment of the present invention; and FIG. 20 is a perspective view of a removable cover of the aroma pod of FIG. 18.

DETAILED DESCRIPTION OF PREFERRED EMBODIMENTS

Figure 1:
FIG. 1 is a perspective view of a liquid flavor enhancement apparatus, including a lid, a liquid container and an aroma pod, according to an embodiment of the present invention.
Figure 2:
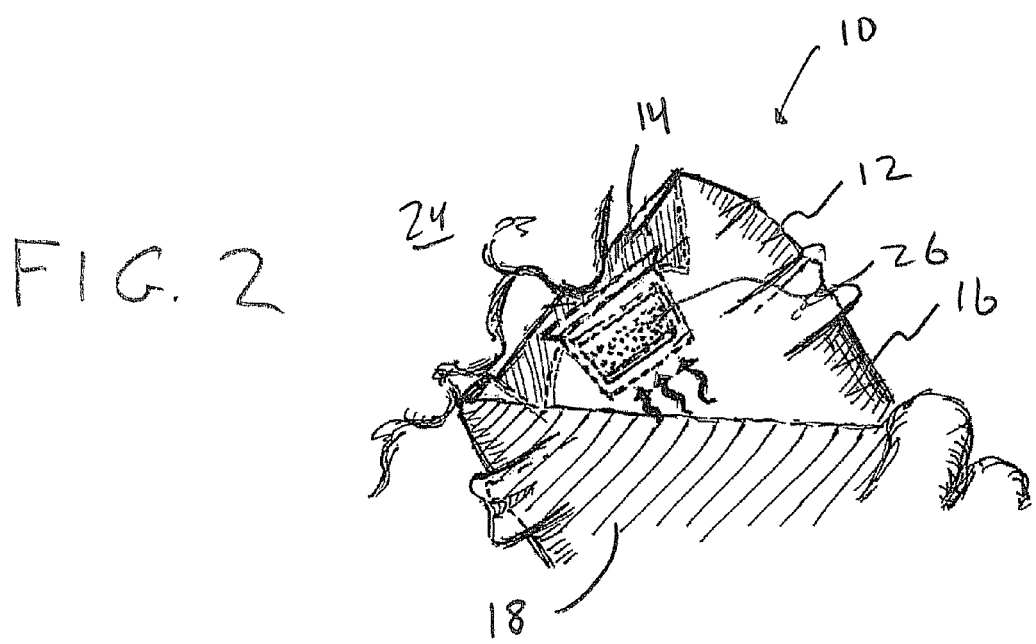
FIG. 2 is a partially cutaway perspective view of the apparatus of FIG. 1.

Referring to FIGS. 1 and 2, according to an embodiment of the present invention, a liquid flavor enhancement apparatus 10 includes a lid 12 with an aroma pod 14 arranged therein. The lid 12 covers a container 16 for a liquid 18 and allows a user 24 to drink therefrom. The lid 12 and aroma pod 14 allow air from within the container 16 to exit through the aroma pod 14, which contains an aromatic material 26. Accordingly, the apparatus 10 allows the user 24 to inhale aromas from the aromatic material 26 in connection with drinking the liquid 18, enhancing the flavor thereof.

The lid 12 is preferably removably attached to the container 16, to facilitate filling; however, permanently attached lids could be used. It is preferably that the lid, whether by detachment or otherwise, allows the container 16 to be filled without wetting the aromatic material 26 within the aroma pod 14. Similarly, the aroma pod 14 is preferably removable from the lid 12; however the aroma pod 14 could also be integral with the lid 12. The lid 12, aroma pod 14 and container 16 can each be designed for single-use or repeated usage.

Referring to FIGS. 3-5, the lid 12 has a first surface 30 and a second surface 32. With the lid 12 on the container 16 (see FIG. 1), the first surface 30 generally faces away from the container 12 and the second surface 32 generally faces toward the container 12. It will be appreciated that the first and second surfaces 30, 32 can be, and are in the depicted embodiment, multi-faceted.

A consumption opening 34 is defined in the lid 12 extending between the first and second surfaces 30, 32, through which the liquid 18 may exit during consumption by the user 24 (see FIG. 2). Preferably, the consumption opening 34 is located proximate to the perimeter of the lid 12 for ready access by the user 24.

Referring to FIGS. 5-7, a pod well 38 is also defined in the lid 12 to removably accommodate the aroma pod 14. The pod well 38 is preferably formed integrally with the lid 12, but could also be inserted into an opening therein. The pod well 38 has a sidewall 40 and a floor 42. The sidewall 40 includes a groove 44 and ribs 46 to facilitate releasable engagement with complementary structure of the aroma pod 14.

A plurality of aroma openings 50 extend through the floor 42 to allow air from the container 16 to enter the pod well 38 and from thence the aroma pod 14. Advantageously, the aroma openings 50 are only formed in a half of the floor 42 more distant from the consumption opening 34. Additionally, the aroma pod 14 and pod well 38 are dimensioned such that, with the aroma pod 14 installed, there is a gap 52 between the aroma pod 14 and the floor 42. The gap 52 and the placement of the openings 50 reduce the likelihood that the liquid 18 can impinge on the aroma pod 14 during normal use of the container 16 in connection with consumption of the liquid 18 (see FIG. 2).

Referring again to FIG. 3-5, the aroma pod 14 is advantageously approximately centrally located in the lid 12. For a wide range of containers, this arrangement will place the aroma pod 14 proximate to the nose of the user 24 (see FIG. 2) when drinking from the consumption opening 34, increasing the effectiveness of the aromatic material 26.

The lid 12 further includes an attachment mechanism, such as a snap-fit ring 56, for securing to the container 16. Advantageously, the aroma pod 14 is located sufficiently far above the ring 56 to prevent even partial immersion of the pod 14 when the lid 12 is secured to a very fully container 16.

A first ridge 58 extends downwardly, toward the container 16 between the aroma pod 14 and the consumption opening 34. The first ridge 58 facilitates the formation of a seal about the consumption opening 34 by the user's lips, while also helping to direct the liquid 18 toward the opening 34 and away from the aroma pod 14 during consumption.

A second ridge 60 extends upwards, away from the container 16 partially surrounding the aroma pod 14 but tapering off to be absent in the vicinity of the opening 34. The second ridge 60 helps create a partial cavity around the aroma pod 14 in which aroma can concentrate during consumption (see FIG. 2).

Referring to FIGS. 7-8, the aroma pod 14 includes a body 64 and retention elements 66, 68, 70, with the aromatic material 26 being retained with the body 64 by the retention elements 66, 68, 70. The retention elements are made from scent permeable materials. The aroma pod 14 is dimensioned for accommodation within the lid 12.

The body 64 is generally cylindrical, a most preferably slightly frustroconical, with and outwardly extending collar 74 around a first open end thereof thereof and defines an aroma port and an inwardly extending collar 76 around a second open end thereof. The collar 74 helps prevent over-insertion of the aroma pod 14 into the pod well 38, ensuring the maintenance of the gap 52 therebetween. The collar 76 supports the retention element 70, which can be attached thereto.

The retention element 66 is the form of a plate and is secured across the first open end of the body 64. A plurality of holes 78 are defined in the retention element 66 to allow for scent permeation. The retention element 66 supports the retention element 68, which can be attached thereto.

The retention elements 68 and 70 extend across the first and second open ends of the body 64, and are preferably made from a thin scent-permeable paper or fabric material. The elements 68 and 70 can connect, if desired, to effectively form a pouch for the aromatic material 26, or completely separated elements 68, 70 can be used.

The aromatic material 26 is not necessarily limited to any particular material or form, but can advantageously include a dry, granular material. In addition to one or more actively aromatic components, the aromatic material 26 can include, for example, heat retaining components, desiccant components, accelerator and/or catalyst components, spacer components, packing agents. For instance, rice grains can be included distributed through the aromatic material 26 as a desiccant and heat retaining component. "Sponge" or "fluff" elements can be added to help separate the granular material and allow air to pass more freely therethrough.

Figure 11:
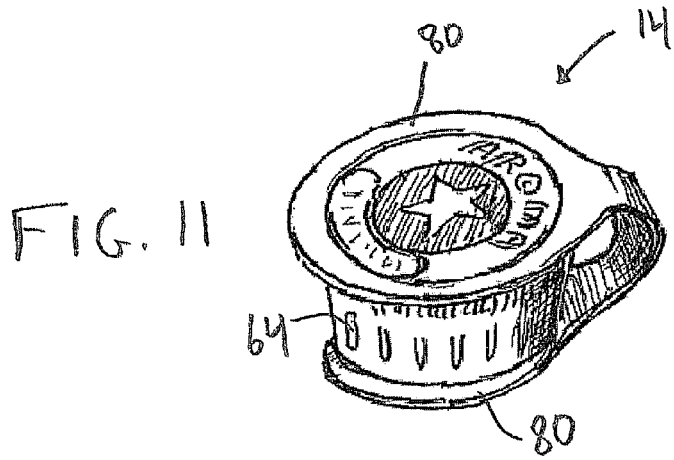
FIG. 11 is a perspective view of the aroma pod if Figure, with seals in place.

Referring to FIG. 11, to prevent dissipation of the aroma before use, the aroma pod 14 can include aroma impervious seals 80 covering the open ends of the body 64. The seals 80 can be connected, as depicted, or separate, and are removed immediately prior to use of the aroma pod 14 in the apparatus 10 in connection with the consumption of the liquid 18.

In use, with reference to FIGS. 1-11, the container 16 is filled with the liquid 18. The seals 80 are removed from the aroma pod 14 and the pod 14 is inserted within the pod well 38 of the lid 12. The lid 12 is secured to the container 16 and the user 24 drinks therefrom, enjoying the aroma from the aromatic material 26 before, during and after consumption of the liquid 18.

For many aromatic materials, the wetting of the materials will alter or eliminate the particular aroma thereof. One example of this is coffee grounds, which when dry possess a fragrant coffee aroma that is lacking from the used, wet grounds. Advantageously, the apparatus 10 allows aromatic materials to be used in connection with liquid consumption, and to be placed in communication with the airspace within the liquid container, without wetting the materials with the liquid being consumed.

The present invention is particularly advantageous when used in connection with hot liquids, as the communication through container lid 12 via the aroma pod 14, allows the vapors to pass therethrough. The hot vapors can enhance the effectiveness of aroma distribution, and result in new scent and flavor combinations before and after actual drinking occurs.

In a particularly advantageous implementation, the hot liquid can be coffee with the aromatic material including coffee grounds. In this implementation, the aromatic coffee grounds can give a significant flavor boost to the liquid coffee. In a variation, the coffee grounds can be caffeinated and the liquid coffee can be decaffeinated, allowing the richer aroma of caffeinated coffee to enhance the flavor of decaffeinated coffee without the need for the user to actually consume caffeine.

The present invention can offer a powerful culinary tool, allowing the mixing of aromas and flavors that would not naturally occur together. For instance, coffee aroma could be used with tea, or vice versa. In other examples, vanilla, cinnamon, hazelnut, chocolate, mint, lemon, almond, etc. aromas can be combined with virtually any liquid. Even aromas associated with products not normally eaten or drunk in connection with food can be used, such as pine or tobacco. In other advantageous examples, a menthol substance can be used in the aromatic material and tea as the liquid, or a sweetened substance can be used in the aromatic material with an unsweetened liquid, or a diet beverage.

The above embodiment is provided for exemplary and illustrative purposes. Those skilled in the art will appreciate that the present invention is not necessarily limited thereto. For instance, not every feature described is required in connection with the present embodiment, and various features can be used in other combinations, or in other applications, within the scope of the present invention. In the following description of alternate embodiments, similar components are referred to with similar reference numbers.

Figure 12:
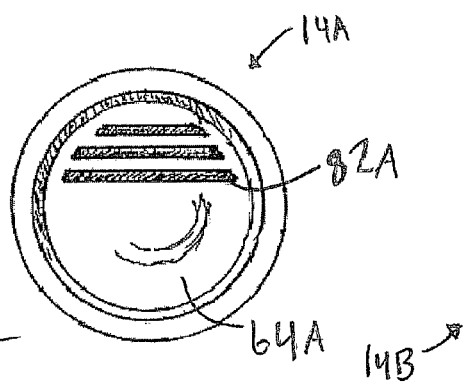
FIGS. 12 and 13 are bottom views of aroma pods, according to alternate embodiments of the present invention.
Figure 13:
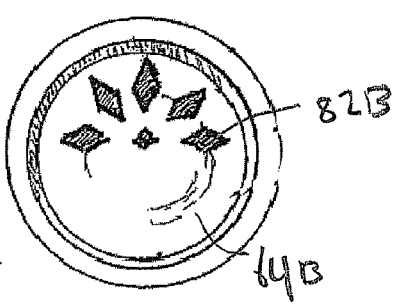
Figure 14:
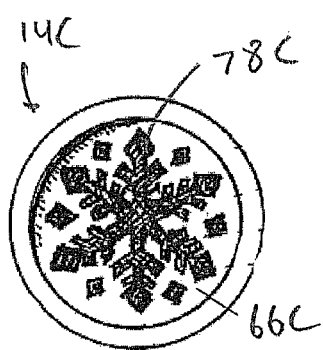
FIGS. 14-16 are top views of aroma pods, according to alternate embodiments of the present invention.
Figure 15:
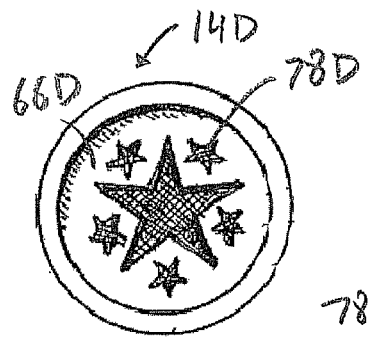
Figure 16:
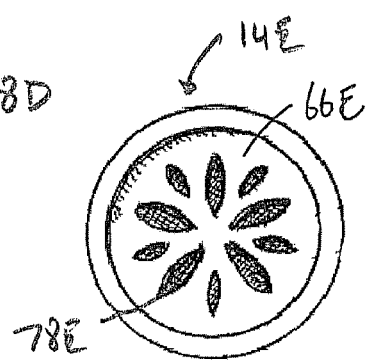

For example, referring to FIGS. 12 and 13, aroma pods 14A and 14B have discrete openings 82A, 82B on the bottom of the bodies 64A, 64B (and only one one-half thereof), rather than a single large opening defined by an inwardly-extending collar. Referring to FIGS. 14-16, aroma pods 14C-14E have different configurations of openings 78C-78E on retention elements 66C-66E.

Additionally, referring to FIG. 17, in a liquid flavor enhancing apparatus 10F, the aroma pod 14F is simply inserted through an opening 84F in the lid 12F, rather than being arranged within a pod well. In the apparatus 10G of FIG. 18, the aroma pod 14G is simply arranged over the opening 84G in the lid 12G. The aroma pod 14G can be in the form of a scent permeable sachet or disc, without separate housing and retention elements.

Referring to FIGS. 19 and 20, a liquid flavor enhancing apparatus 10I1 includes a lid 12H with a re-fillable aroma pod 14H. The pod 14H has a removable cover 66H that allows the aromatic material 26H to be emptied and re-filled. The configuration can help a user further customize their flavor enhancement experience.

The foregoing is not an exhaustive list of alternatives; rather, those skilled in the art will appreciate that these and other modifications, as well as adaptations for various circumstances, will fall within the scope of the invention as herein shown and described.

What is claimed is:

1. A liquid flavor enhancement apparatus comprising:
   a container adapted to hold a liquid to be consumed;
   a lid for the container, the lid having a first surface facing generally away from the container and a second surface facing generally toward the container, the lid defining a consumption opening extending therethrough to allow passage of the liquid from the container through the lid during consumption of the liquid; and
   an aroma pod arranged in the lid such that air inside the container is allowed to pass therethrough from the second to the first surface of the lid, the pod having a body and first and second aroma-permeable retention elements, and an aromatic material retained in the body between the first and second retention elements.

2. The apparatus of claim 1, wherein the lid is adapted for removable connection to the container.

3. The apparatus of claim 1, wherein the consumption opening is arranged proximate to a perimeter of the lid.

4. The apparatus of claim 3, wherein the aroma pod is arranged approximately centrally in the lid.

5. The apparatus of claim 3, wherein the aroma pod is removably arranged in the lid.

6. The apparatus of claim 5, wherein the lid defines a pod well therein having an upper opening, a sidewall and a floor, at least one aroma opening being defined in the lid allowing air to pass from the container into the pod well, and the aroma pod is removably arranged in the pod well through the upper opening.

7. The apparatus of claim 6, wherein the at least one aroma opening extends through the floor of the pod well.

8. The apparatus of claim 7, wherein at least one aroma opening is located only in a half of the floor more distant from the consumption opening.

9. The apparatus of claim 6, wherein there is a gap between the aroma pod and the floor of the pod well.

10. The apparatus of claim 1, wherein the lid includes a ridge extending generally toward the container between the consumption opening and the aroma pod.

11. The apparatus of claim 1, wherein the lid includes a ridge extending generally away from the container extending partially around the aroma pod.

12. The apparatus of claim 11, wherein the ridge is absent in the vicinity of the consumption opening.

13. The apparatus of claim 1, wherein at least one of the first and second aroma-permeable retention elements includes an aroma-permeable paper or fabric material.

14. The apparatus of claim 1, wherein at least one of the first and second aroma-permeable retention elements is a retention plate with at least one hole defined therein.

15. The liquid flavor enhancement apparatus of claim 1, wherein an uppermost portion of the aroma pod is closer to an uppermost portion of the lid than to a lowermost portion of the lid.

16. The liquid flavor enhancement apparatus of claim 1, wherein the aroma pod is arranged in the lid such that the aromatic material will not be wetted during the consumption of the liquid.

17. A method for liquid flavor enhancement using the liquid flavor enhancement apparatus of claim 1, the method comprising:
    pouring a liquid into the container;
    attaching the lid and the aroma pod, with the aromatic material being dry; and
    drinking the liquid from the container through the consumption opening such that the aromatic material is not wetted.

18. The method of claim 17, wherein drinking the liquid through the container further includes bringing a nose of the drinker proximate to the aroma pod.

* * * * *